US006931576B2

United States Patent
Morrison et al.

(10) Patent No.: US 6,931,576 B2
(45) Date of Patent: Aug. 16, 2005

(54) DATA INTEGRITY DEVICE PROVIDING HEIGHTENED ERROR PROTECTION IN A DATA PROCESSING SYSTEM

(75) Inventors: John M. Morrison, Sunnyvale, CA (US); Joseph Sanzio, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 558 days.

(21) Appl. No.: 10/041,024

(22) Filed: Jan. 7, 2002

(65) Prior Publication Data

US 2003/0131291 A1 Jul. 10, 2003

(51) Int. Cl.[7] .............................................. G06F 11/00
(52) U.S. Cl. ........................................ 714/54; 711/163
(58) Field of Search ...................... 714/54, 4–6, 10–13, 714/42, 769, 770, 805; 711/111, 152, 163–164; 713/166

(56) References Cited

U.S. PATENT DOCUMENTS

| | | | |
|---|---|---|---|
| 4,328,542 A | * 5/1982 | Anastas et al. ............. 711/163 |
| 5,153,881 A | * 10/1992 | Bruckert et al. ............. 714/10 |
| 5,473,770 A | 12/1995 | Vrba | |
| 5,581,734 A | 12/1996 | DiBrino et al. | |
| 5,588,012 A | 12/1996 | Oizumi | |
| 5,636,359 A | * 6/1997 | Beardsley et al. ........... 711/122 |
| 5,828,578 A | 10/1998 | Blomgren | |
| 6,023,780 A | * 2/2000 | Iwatani ........................ 714/770 |
| 6,101,589 A | 8/2000 | Fuhrmann et al. | |
| 6,141,770 A | 10/2000 | Fuchs et al. | |
| 6,233,702 B1 | 5/2001 | Horst et al. | |
| 6,247,118 B1 | 6/2001 | Zumkehr et al. | |
| 6,351,838 B1 | 2/2002 | Amelia | |
| 6,367,047 B1 | * 4/2002 | McAuliffe et al. .......... 714/755 |
| 2001/0025338 A1 | 9/2001 | Zumkehr et al. | |
| 2003/0048276 A1 | 3/2003 | Wasserman et al. | |
| 2003/0070126 A1 | 4/2003 | Werner et al. | |
| 2003/0147167 A1 | * 8/2003 | Asano et al. ................. 360/53 |

* cited by examiner

*Primary Examiner*—Dieu-Minh Le
(74) *Attorney, Agent, or Firm*—Robert C. Kowert; Meyertons, Hood, Kivlin, Kowert & Goetzel, P.C.

(57) ABSTRACT

Various embodiments of systems and methods of providing heightened data integrity in a data processing system are disclosed. A data processing system may include a host computer system, an interconnect coupled to the host computer system, and a storage array coupled to the interconnect and configured to store data received from the host computer system over the interconnect. A data integrity device including at least one processor may be coupled to the interconnect. The data integrity device is configured to be enabled and disabled. If the data integrity device is disabled, the data processing system may provide a base level of error protection for the data. If the data integrity device is enabled, the processor is configured to perform a first data integrity operation on the data in order to provide a heightened level of error protection for the data.

67 Claims, 12 Drawing Sheets

| Data Integrity Device Setting | Description | Effect |
| --- | --- | --- |
| N/A | Data integrity device not present in system | Default level of error protection provided by host, array controller, and/or disk drives |
| 0 | No processors enabled on data integrity device | Default level of error protection provided by host, array controller, and/or disk drives |
| 1 | Single processor enabled in data integrity device | Single data integrity processor performs data integrity operation on data in storage array |
| 2 | Two processors enabled in data integrity device | Both processors perform data integrity operation on data and compare results |
| 3 | Three processors enabled in data integrity device | Three processors in data integrity device perform data integrity operation on data and vote on results |

*FIG. 7*

DATA INTEGRITY DEVICE PROVIDING HEIGHTENED ERROR PROTECTION IN A DATA PROCESSING SYSTEM

BACKGROUND OF THE INVENTION

1. Field of the Invention

This invention relates to error detection in storage systems.

2. Description of the Related Art

Many storage arrays provide protection against data loss by storing redundant data. Such redundant data may include parity information (e.g., in systems using striping) or additional copies of data (e.g., in systems providing mirroring). A storage system's ability to reconstruct lost data may depend on how many failures occur before the attempted reconstruction. For example, some RAID (Redundant Array of Independent/Inexpensive Disks) systems may only be able to tolerate a single disk failure or error. Once a single disk fails or loses data through an error, such systems are said to be operating in a degraded mode because if additional disks fail before the lost data on the failed or erroneous disk has been reconstructed, it may no longer be possible to reconstruct the lost data. The longer a storage array operates in a degraded mode, the more likely it is that an additional failure will occur. As a result, it is desirable to detect and repair disk failures or other anomalies so that a storage array is not operating in a degraded mode.

Errors that may cause a storage system to operate in a degraded mode include transmission errors, total disk failures, and disk errors. Transmission and disk errors may cause less data vulnerability or data loss than failures, but they may be more difficult to detect. For example, disk drives may occasionally corrupt data, and this corruption may not be detected by the storage system until the data is read from the disk. The corruptions may occur for various different reasons. For example, bugs in a disk drive controller's firmware may cause bits in a sector to be modified or may cause blocks to be written to the wrong address. Such bugs may cause storage drives to write the wrong data, to write the correct data to the wrong place, or to not write any data at all. Another source of errors may be a drive's write cache. Many disk drives use write caches to quickly accept write requests so that the host or array controller can continue with other commands. The data is later copied from the write cache to the disk media. However, write cache errors may cause some acknowledged writes to never reach the disk media. The end result of such bugs or errors is that the data at a given block may be corrupted or stale. Errors such as drive errors and transmission errors may be "silent" in the sense that no error messages are generated when such errors occur.

In general, it is desirable to detect errors soon after they occur so that a storage system is not operating in a degraded mode for an extended time. However, error detection mechanisms are often expensive to implement (e.g., if they require a user to purchase additional or more expensive hardware and/or software) and/or have a detrimental impact on storage system performance. Thus, it may be desirable to allow users to select whether to purchase the error detection mechanism independently of the overall system and/or to allow users to independently enable and disable the error detection mechanism.

SUMMARY

Various embodiments of systems and methods of providing heightened data integrity in a data processing system are disclosed. In one embodiment, a data processing system includes a host computer system, an interconnect coupled to the host computer system, and a storage array coupled to the interconnect and configured to store data received from the host computer system over the interconnect. In some embodiments, the storage array may be a RAID (Redundant Array of Inexpensive Disks) array. A data integrity device including at least one processor may be coupled to the interconnect. The data integrity device is configured to be enabled and disabled. The data integrity device may also be configured to be removed from the data processing system. If the data integrity device is disabled, the data processing system may provide a base level of error protection for the data. If the data integrity device is enabled, the processor is configured to perform a first data integrity operation on the data in order to provide a heightened level of error protection for the data in addition to the base level of error protection provided by the data processing system.

The processor may perform the first data integrity operation by performing a checksum calculation. In some embodiments, performing a data integrity operation may involve capturing a checksum transferred with the data. Another data integrity operation may involve comparing two checksums. Yet another data integrity operation may involve verifying and/or correcting data encoded using an error correcting code.

The data integrity device may be configured to provide an error indication if the data integrity operation indicates that the data is erroneous. For example, the processor(s) in the data integrity device may capture a checksum transmitted with the data and recalculate a checksum for the data. If the captured checksum differs from the recalculated checksum, the data integrity device may generate an error indication.

The data integrity device may be configured to perform the first data integrity operation on the data as the data is written to the storage array. In some embodiments, the data integrity device may perform a data integrity operation on data in response to an indication that the data has been written to the storage array. The data integrity device may also be configured to perform a second data integrity operation on the data as the data is read from the storage array.

In some embodiments, the data integrity device may include a plurality of processors. Each of the processors may be configured to perform the first data integrity operation on the data. In one embodiment, each of the processors may perform the data integrity operation in lockstep. Each of the processors may be configured to be enabled independently of each of other processors. In one embodiment, a control function running on the host system may be configured to allow a user to select how many of the plurality of processors are enabled.

If two of the plurality of processors are enabled, the data integrity device is configured to compare the enabled processors' results. If the results are not equal, the data integrity device may be configured to generate an error indication. Additionally, the data integrity device may be configured to disable the processors and/or to initiate diagnostics on the processors. If the data integrity device includes additional processors, the data integrity device may enable one or more of those processors in response to disabling the other processors.

If more than two processors are enabled, the data integrity device may be configured to perform a voting operation on each of the enabled processors' results. If a majority of the enabled processors generates the same result and a minority of the enabled processors generates a different result, the data integrity device is configured to provide an error indication indicating that an error occurred in the data integrity device. The data integrity device may also be configured to disable the processors that generate the different result. In some embodiments, the data integrity device may include redundant processors that the data integrity device can enable if one or more of the enabled processors are disabled. In one embodiment, the data integrity device may be configured to initiate diagnostic tests on the processors that generate the different result.

In some embodiments, other components in the data processing system may also perform data integrity operations on the data. For example, an array controller configured to manage a storage array may be configured to perform a data integrity operation on the data. Similarly, a file system running on the host system or a disk drive controller may be configured to perform a data integrity operation on the data in some embodiments.

In one embodiment, the host system may be configured to reduce the rate at which the data is transferred on the interconnect in response to the data integrity device being enabled.

BRIEF DESCRIPTION OF THE DRAWINGS

A better understanding of the present invention can be obtained when the following detailed description is considered in conjunction with the following drawings, in which:

FIG. 7 shows settings that may be used with one embodiment of a data integrity device;

Figure 1:
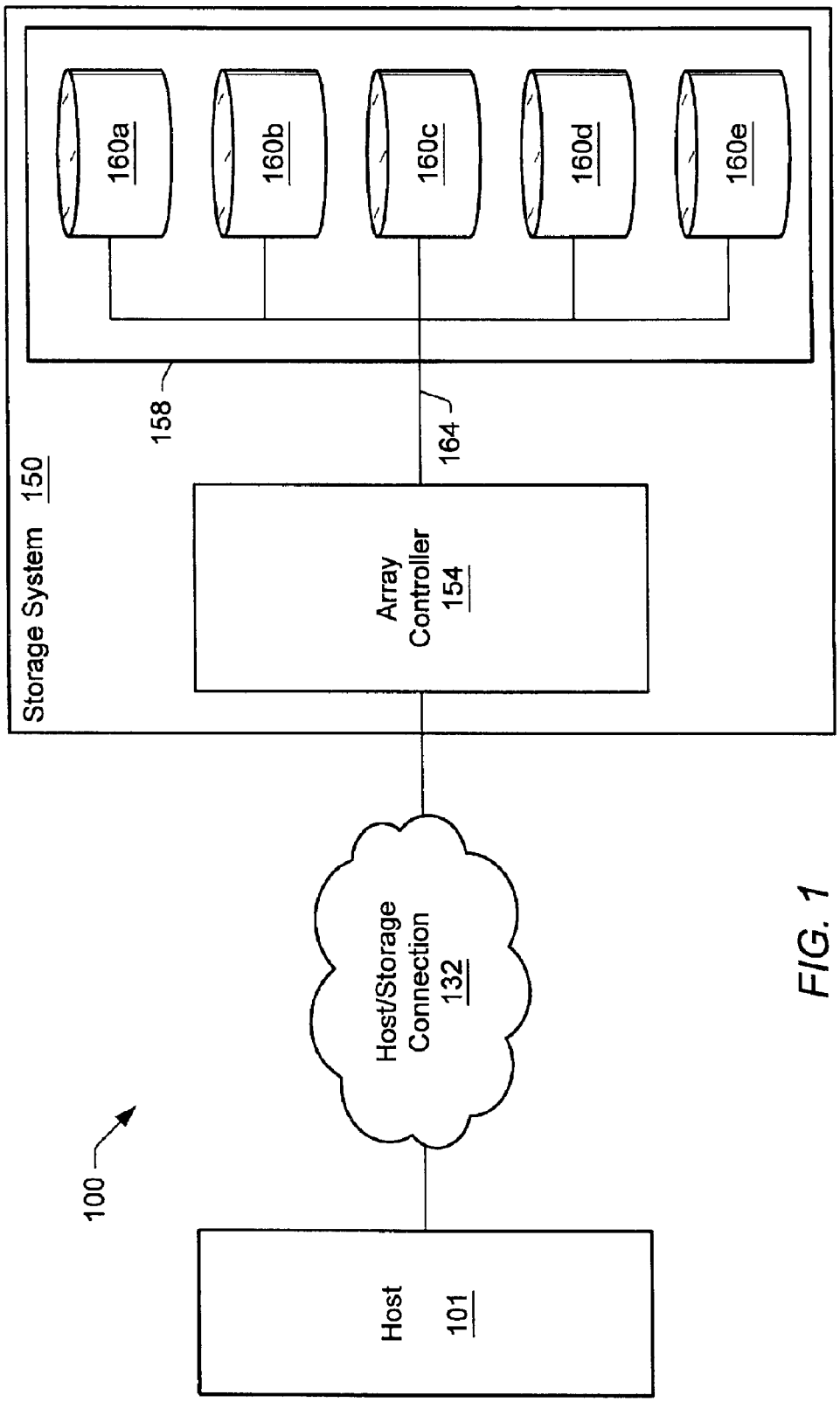
FIG. 1 illustrates one embodiment of a data processing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Storage System

FIG. 1 shows a functional block diagram of one embodiment of a data processing system 100 that may include an embodiment of a data integrity device. Data processing system 100 includes a host 101 connected to a storage system 150 via host/storage connection 132. Host 101 may include one or more processors and various I/O devices such as a monitor, keyboard, mouse, etc. (not shown). System memory to temporarily store data and software instructions may also be provided in host 101. Host 101 may be coupled to host/storage connection 132 by an I/O bus such as a PCI (Peripheral Component Interconnect) bus. In one embodiment, data processing system 100 may be configured as a SAN (Storage Area Network).

Host/storage connection 132 may be, for example, a local bus, a network connection, an interconnect fabric, or a communication channel. Storage system 150 may be a RAID storage subsystem or other type of storage array. In various embodiments, a plurality of hosts 101 may be in communication with storage system 150 via host/storage connection 132.

Contained within storage system 150 is a storage device array 158 that includes a plurality of storage devices 160a–160e (collectively referred to as storage devices 160). Storage devices 160a–160e may be, for example, magnetic hard disk drives, optical drives, magneto-optical drives, tape drives, solid state storage, or other non-volatile memory. As shown in FIG. 1, storage devices 160 are disk drives and storage device array 158 is a disk drive array. Although FIG. 1 shows a storage device array 158 having five storage devices 160a–160e, it is understood that the number of storage devices 160 in storage device array 158 may vary and is not limiting.

Storage system 150 also includes an array controller 154 connected to each storage device 160 in storage array 158 via one or more data paths 164. Data path 164 may provide communication between array controller 154 and storage devices 160 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), HiPPI (High Performance Parallel Interface), AT Attachment (ATA), etc. Various combinations and variations of these protocols may also be used in some embodiments.

Array controller 154 may take many forms, depending on the design of storage system 150. In some systems, array controller 154 may only provide simple 1/0 connectivity between host 101 and storage devices 160 and the array management may be performed by host 101. In other embodiments of storage system 150, such as controller-based RAID (Redundant Array of Inexpensive Disks) systems, array controller 154 may also include a volume manger to provide volume management, data redundancy, and file management services. In other embodiments of the present invention, the volume manager may reside elsewhere in data processing system 100. For example, in software RAID systems, the volume manager may reside on host 101 and be implemented in software. In other embodiments, the volume manager may be implemented in firmware that resides in a dedicated controller card on host 101. In some embodiments, array controller 154 may be connected to one or more of the storage devices 160. In yet other embodiments, a plurality of array controllers 154 may be provided in storage system 150 to provide for redundancy and/or performance improvements.

The array controller 154 may, in some embodiments, operate to perform striping and/or mirroring of data in the array of storage devices 160. Each element of the array of storage devices 160 may be a separate disk or any other logical division of storage devices. For example, each element of the array may be a cylinder of a hard disk. It is also noted that the system may include multiple storage systems 150. Also, each storage system 150 may include multiple arrays 160 of multiple disks and/or multiple storage array controllers 155.

Data processing system 100 may include file system software running on host 101 that provides logical structures and software routines that may be used to control access to the storage system 150. For example, in some embodiments, the file system may be part of an operating system running on computer system 100.

There are many possible sources of undetected errors that may occur in storage system 150. Transmission errors may occur as data is transferred between host 101 and storage system 150. Disk errors may also occur. For example, many disk controllers contain firmware that defines how the disk controller works. However, there may be errors in the firmware. These errors may cause the disk to write the wrong data, to write the correct data to an incorrect location, or to not write any data at all. Firmware errors may also cause data to be modified erroneously. Other possible undetected errors include write cache errors that may result in a write being acknowledged even though no data is actually written to disk. While the disk controllers may, in some embodiments, be configured to detect certain errors, they may not be able to detect all possible errors. The undetectable errors are sometimes referred to as "silent errors" or silent data corruption (SDC) since no error state is entered and no error condition is generated when they occur. For example, a disk controller may experience a silent error when it assumes a write operation has completed successfully even though an error has actually occurred. Silent errors may lead to stale or corrupt data. Stale or corrupt data may not be detected until a subsequent read, and at that time, it may no longer be possible to reconstruct the data.

In some embodiments, a storage system such as storage system 150 may not be configured to provide any data redundancy. For example, storage system 150 may be configured as Just a Bunch of Disks (JBOD) storage array or as a RAID 0 array. In such an array, a silent error may corrupt data. Unless a valid backup of that data is available, that data may be permanently lost. Furthermore, a condition that causes a silent error may recur, corrupting other data in the storage system. Consequentially, it is desirable to discover silent errors in order to isolate and correct the source of the error and to prevent further data loss.

A storage system such as storage system 150 may be configured as a redundant storage system in some embodiments. For example, a storage system may be configured as a RAID 5 array. In accordance with RAID 5, such a storage system may store parity information for each data stripe so that lost data may be reconstructed in the event of a device failure. However, an undetected error may corrupt data stored in the storage array. As a result, the storage array may be unknowingly operating in a degraded mode with respect to that data, leaving that data and/or other data vulnerable to a subsequent error or device failure. If a subsequent error or device failure occurs, it may not be possible to reconstruct either the data lost to the error or device failure or the data corrupted by the silent error. Also, as mentioned above, conditions that cause silent errors may recur, causing further data loss or vulnerability. Thus, even in redundant storage arrays, it is desirable to detect errors.

Figure 2:
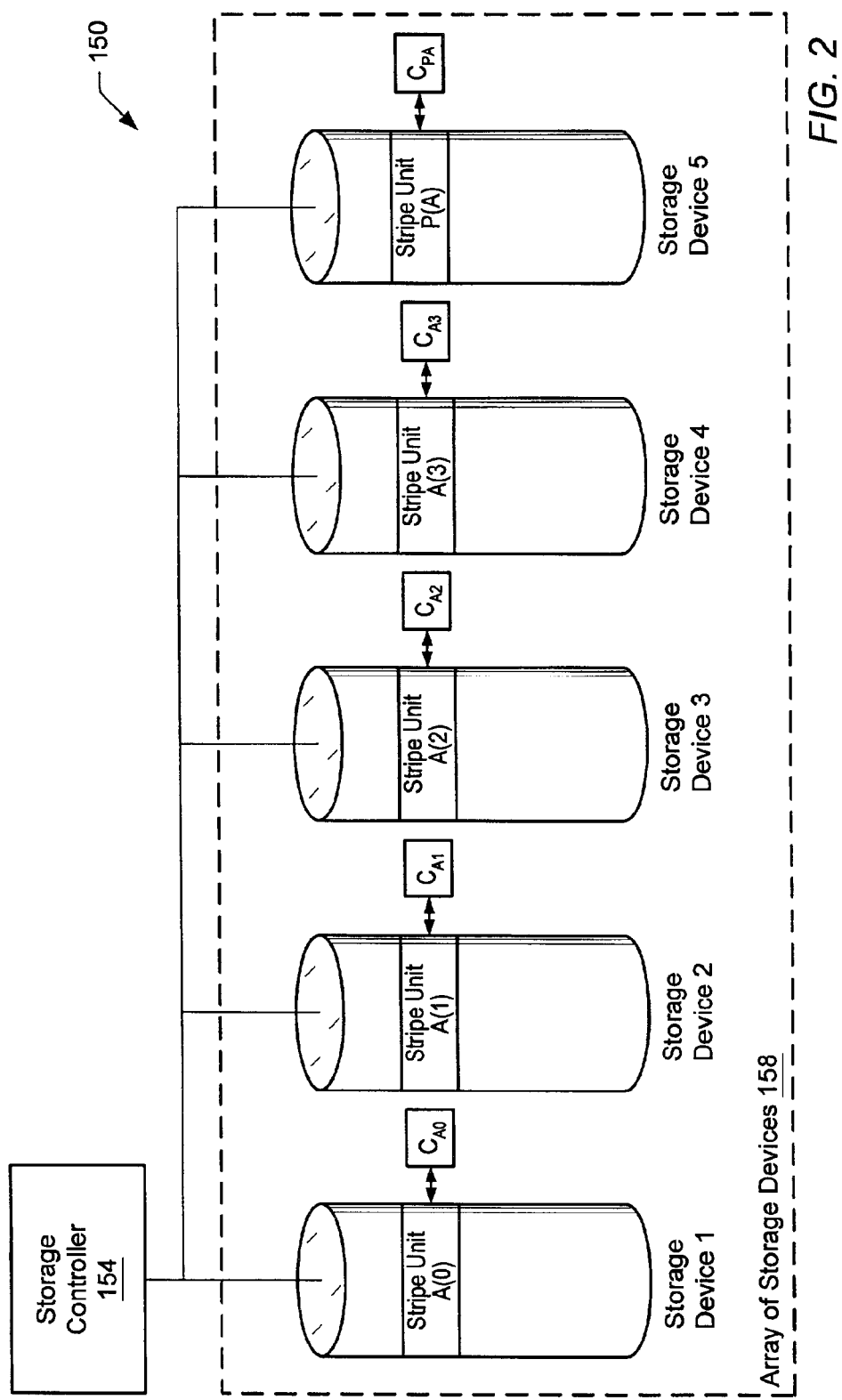
FIG. 2 shows an example of checksums that may be used in some embodiments of a storage array.

In some embodiments, various components in storage system 150 may be configured to provide protection against errors by performing a data integrity operation on data as if flows past those components (e.g., as the data is written to the storage array) and rechecking the result of the data integrity operation at a later time (e.g., when the data is read). Performing a data integrity operation may involve calculating a checksum. Checksums may be several bytes in size, and can be computed in accordance with a variety of algorithms such as parity, CRC (cyclic redundancy code), Hamming codes, etc. Generally, a checksum may be any segment of data that allows the integrity of another unit of data to be verified. Depending on the algorithm used to calculate a checksum, the checksum may be much smaller than the data it verifies. Checksums may enable detection of corrupt or stale data caused by silent errors. FIG. 2 illustrates checksums $C_{A0}$ through $C_{A3}$ corresponding to data blocks A(0) through A(3) and checksum $C_{PA}$ corresponding to parity block P(A).

Often, data processing system users desire a very high level of data integrity (e.g., a near-100% probability that data will not be corrupted). For some users, the error protection provided by the components in data processing system 100 may not be high enough (e.g., such a user may demand 99.999% reliability instead of 99.9%). However, the number of such users may not justify designing an entirely new system with the desired level of error protection. Additionally, providing extra error protection may result in a decrease in performance in some embodiments, and some users may not be willing to sacrifice performance for extra error protection.

Data Integrity Device

Figure 3:
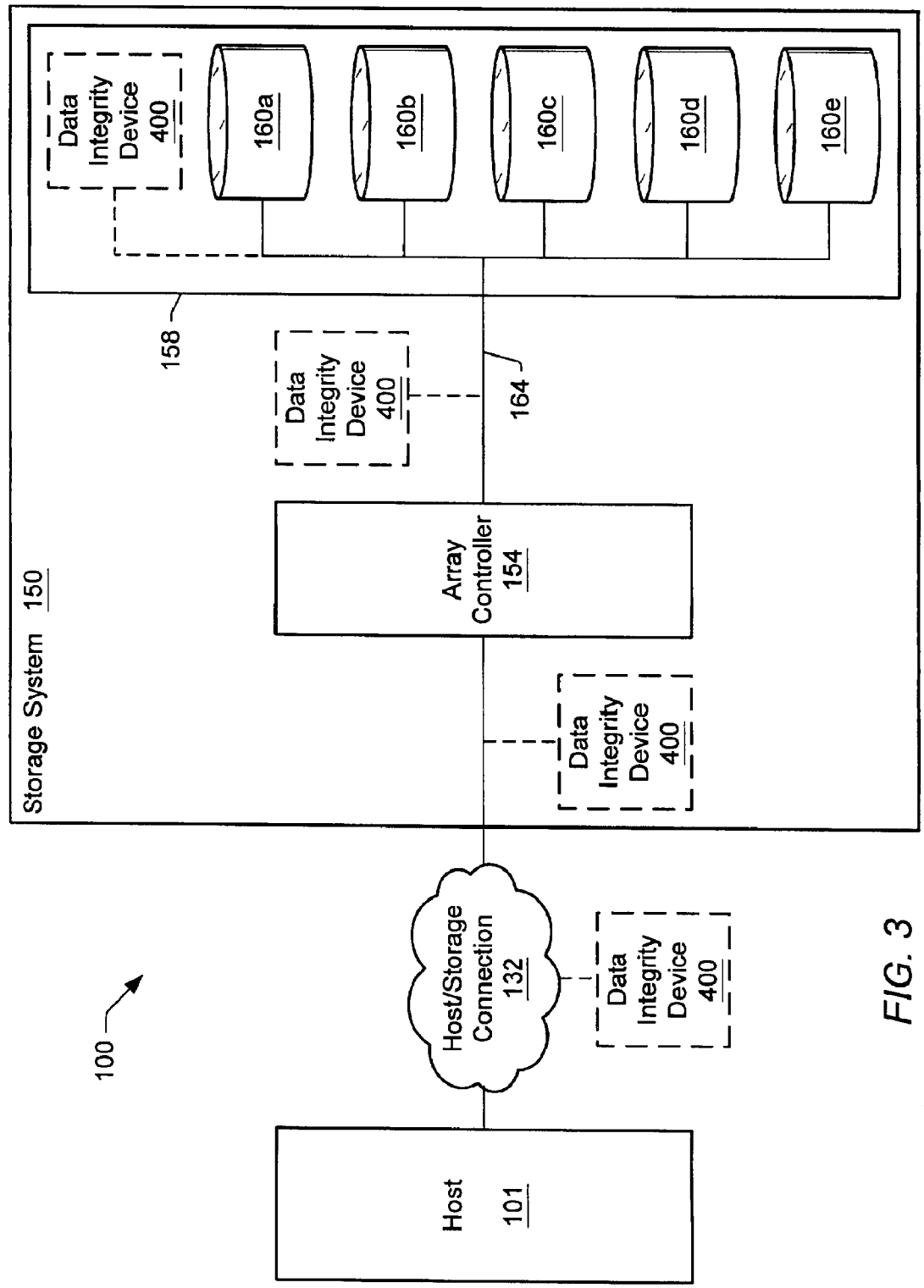
FIG. 3 shows one embodiment of a data processing system that may include one or more data integrity devices.

In order to support both users who want additional error protection and those who do not desire extra error protection (e.g., for performance or financial reasons), an embodiment of a data integrity device 400 as disclosed herein may be provided. FIG. 3 shows how a data integrity device 400 may be coupled into the data processing system of FIG. 1 at various exemplary locations (only one location may actually be used in some embodiments). Data integrity device 400 includes a processor (not shown) configured to perform one or more data integrity operations. Generally, data integrity operations are operations that increase the probability that data errors will be detected and/or corrected. Exemplary data integrity operations include checksum calculations, checksum verification (e.g., comparing a recalculated checksum to a previously calculated checksum), and error correction (e.g., using an error correcting code to correct certain classes of data errors).

In some embodiments, the data integrity device 400 may be installed and removed from the data processing system 100 and/or enabled and disabled without significantly affecting the overall interaction between the other components in the system. For example, such a system may be designed so that users who desire extra data protection may opt to purchase and install the data integrity device while users who do not desire the extra data protection may operate the storage system without the data integrity device. In other embodiments, data integrity device 400 may be included within data processing system 100, but users who do not want the additional data protection (e.g., for performance reasons) may choose to disable the device. Data integrity device 400 may be configured as a card that inserts into a slot within the storage system 150 or storage array 158 in some embodiments.

Generally, data integrity device 400 is designed to provide error protection in addition to the base level of error protection already provided by other components (e.g., storage devices 160 and array controller 154) in data processing system 100. Unlike the other components that may provide error protection, however, data integrity device 400 may be disabled without significantly affecting the ability of host 101 to access storage system 150 for data storage and retrieval. Thus, users who do not consider the additional error protection worthwhile (e.g., for either financial or performance reasons) may operate the storage array without data integrity device 400 or with data integrity device 400 disabled.

Figure 4:
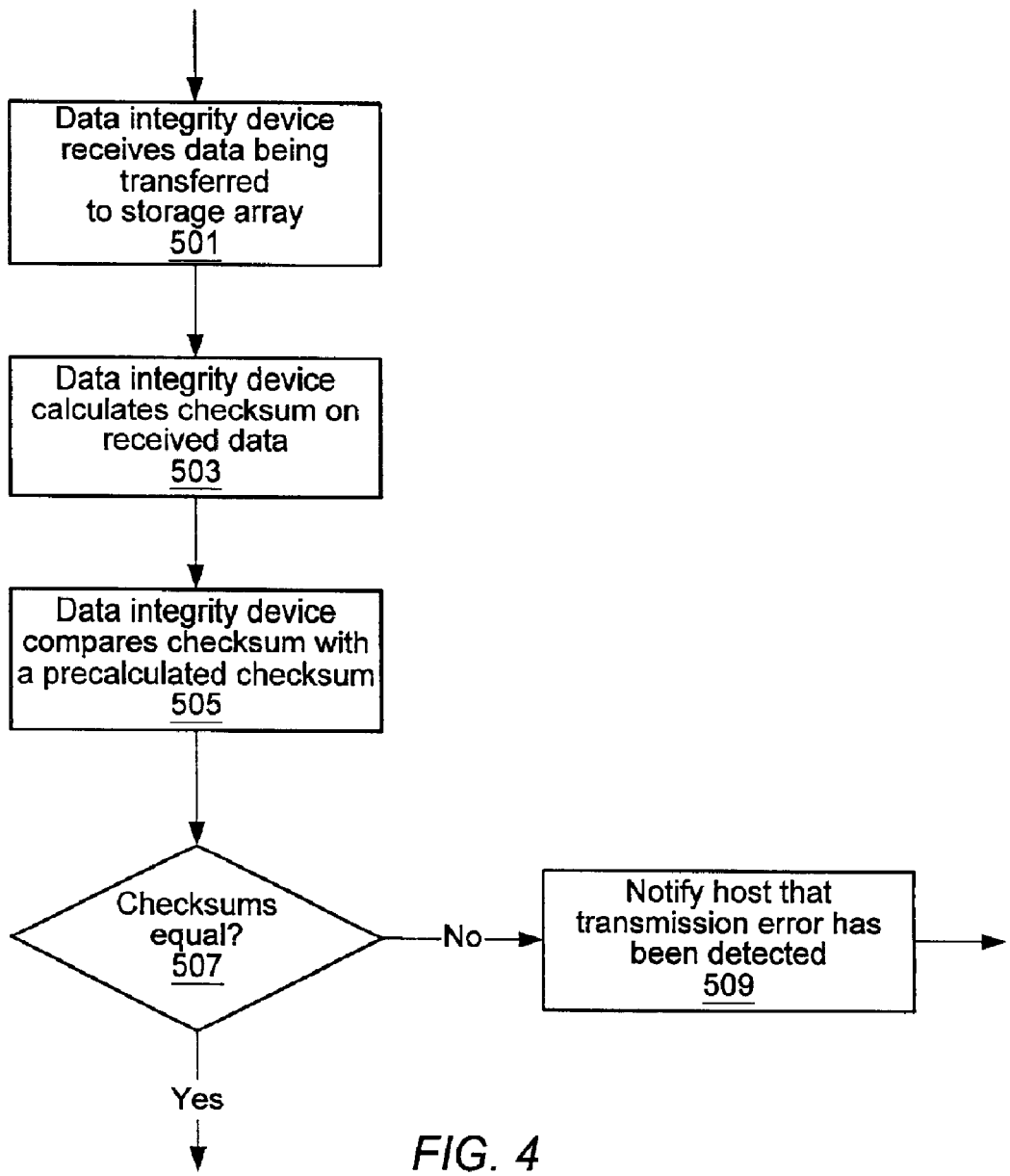
FIG. 4 is a flowchart of one embodiment of a method of operating a data integrity device.

Data integrity device 400 may be configured to check for errors that occur while data is transferred to storage system 150. Data integrity device 400 may check for errors by performing a data integrity operation (e.g., a checksum calculation and/or a checksum verification) on the data. FIG. 4 shows one embodiment of a method of using a data integrity device to check for transmission errors. In one embodiment, as data is written to the storage system, the data integrity device may check for errors by calculating a checksum for the data, as indicated at 501 and 503. The data integrity device may then compare the checksum it calculated with a checksum calculated by another component (e.g., a file system or an array controller) in the storage system, as shown at 505. The precalculated checksum may be transmitted with the data. For example, the array controller may calculate a checksum for the data and encode the data and the checksum into a codeword and transmit the codeword to the storage array. If the two checksums are not equal, the data integrity device may indicate that an error was detected, as shown at 507 and 509. If the data integrity device is configured to correct errors and the detected error is within the class of errors the data integrity device is configured to correct, the data integrity device may correct the data being written and indicate that an error was detected and corrected. For example, if the data integrity device uses Hamming codes to perform data integrity operations, the data integrity device may be able to correct single-bit errors and to provide an indication to the array controller or the host system indicating that an error has been detected and corrected. Note that in other embodiments, the data integrity device may not be able to correct errors in the data stream. However, the data integrity device may provide an indication to the array controller or the host system identifying the error and/or providing information (e.g., a checksum) that may be used to correct or analyze the error.

In other embodiments, data integrity device 400 may calculate checksums for data both as it is stored to the storage array and at a later time. For example, data integrity device 400 may calculate a checksum as the data is written to the storage array. After the data has been written to a disk within the storage array, data integrity device 400 may read the data that was actually stored to disk, recalculate the checksum, and compare the recalculated checksum to the original checksum. Alternatively, the data integrity device 400 may capture a checksum calculated by another component as the data is written to the storage array and compare the captured checksum to a recalculated checksum calculated from the data written to disk. This way, data integrity device 400 may determine whether any silent errors occurred when the data was written to disk. The data integrity device may subsequently reread the data and recalculate the checksum in order to verify that no errors have corrupted the stored data since the last time the checksum was verified. Since the data integrity device's reading of the data from disk to perform a data integrity operation may have an adverse effect on storage system performance, data integrity device 400 may be configured to perform the data integrity operation as the data is being read by the host system and/or when no other activity is currently taking place on the interconnect between data integrity device 400 and the particular disk(s) at issue. In some embodiments, data integrity device 400 may be configured to check for both transmission errors that occur as data is read from and/or written to the storage array (e.g., as shown in FIG. 4) as well as disk errors.

Figure 5:
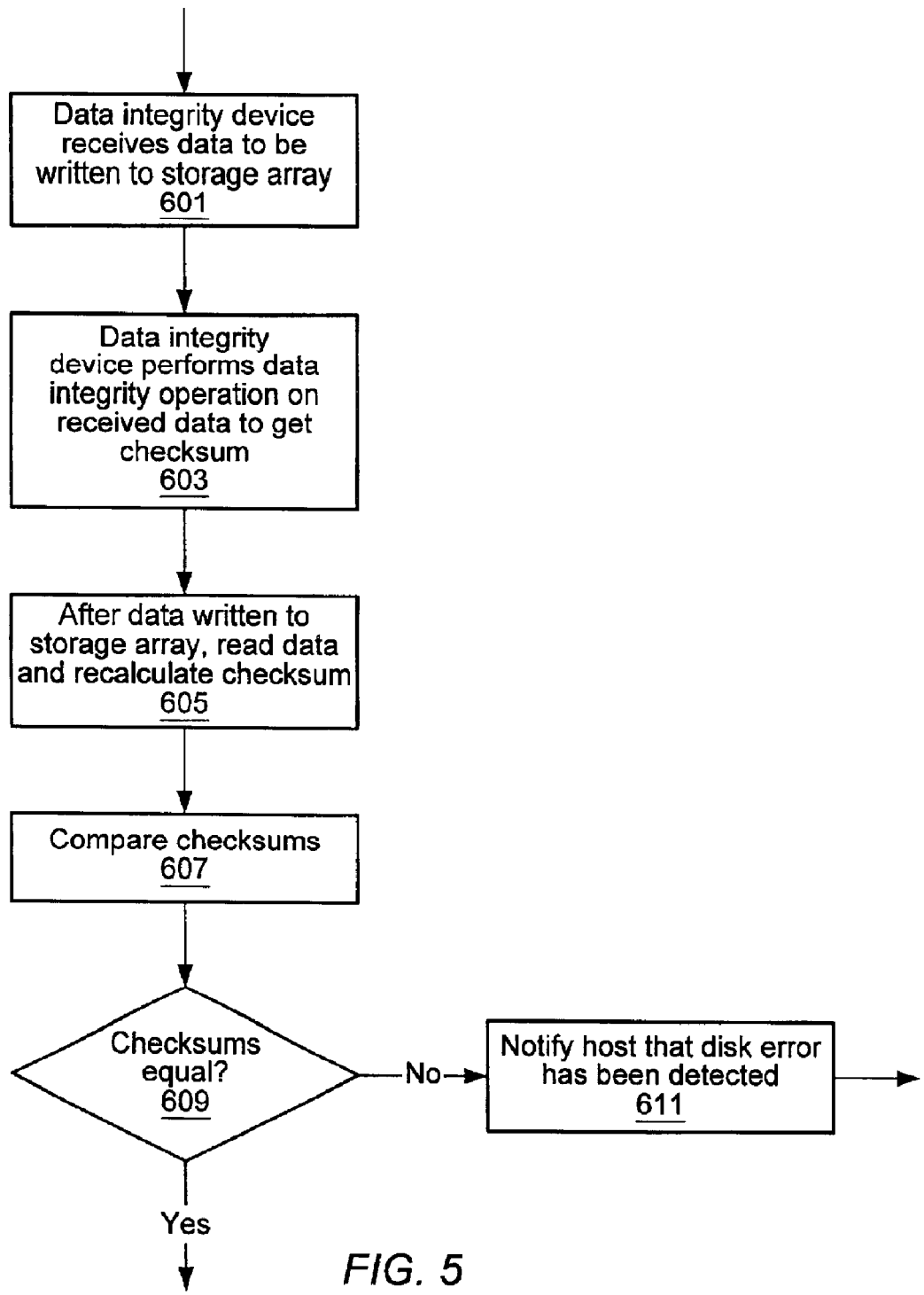
FIG. 5 is a flowchart showing another embodiment of a method of operating a data integrity device.

FIG. 5 shows one embodiment of a method of using a data integrity device to check for disk errors. At 601, the data integrity device receives data being written to the storage array. The data integrity device may then perform a data integrity operation on the received data, as shown at 603. The data integrity operation of block 603 may include capturing a precalculated checksum corresponding to the data or calculating a checksum for the data. After the data is written to disk, the data integrity device may read the data and recalculate the checksum, as shown at 605. In one embodiment, the data integrity device may perform block 605 in response to an indication that the write to the disk(s) has been completed (e.g., a signal from a disk controller). In an alternative embodiment, the data integrity device may be configured to perform block 605 during a time when there is low traffic on the interconnect. The data integrity device may then compare the checksums (the recalculated checksum and the captured or originally calculated checksum), as shown at 607. If the two checksums are not equal, the data integrity device may indicate that a disk error has been detected, as indicated at 609 and 611.

Figure 6:
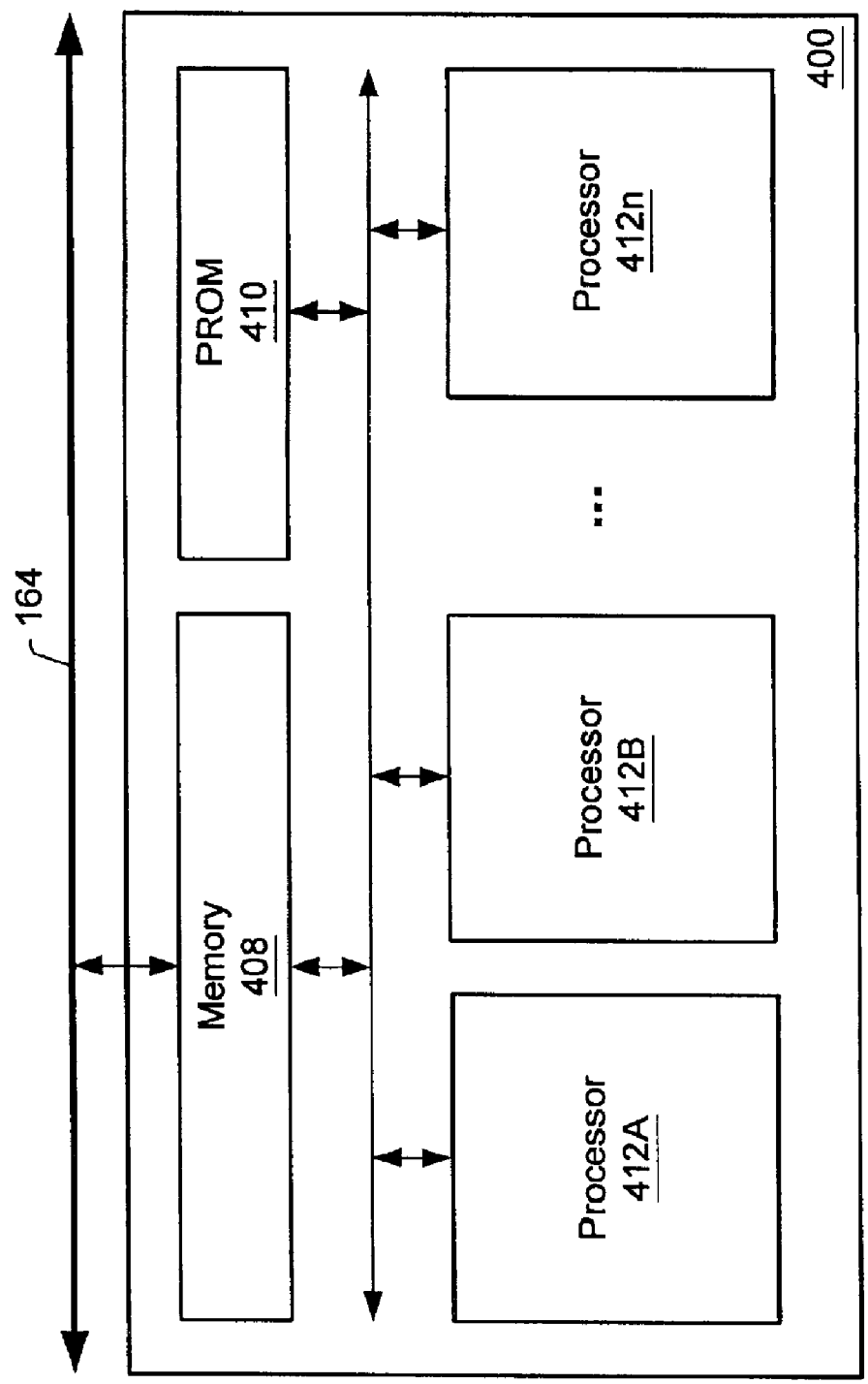
FIG. 6 is a functional block diagram of one embodiment of a data integrity device.

Thus, once installed in a data processing system, data integrity device 400 may be enabled in hardware and/or in software to perform one or more data integrity operations as shown in FIGS. 5 and 6. In one embodiment, a device-specific control function (e.g., a Unix ioctl function) running on the host system may be called with appropriate parameters to enable the data integrity device 400.

In some embodiments, data integrity device 400 may offer several different levels of error protection. For example, in one embodiment, data integrity device 400 may include several processors 412A–412n (collectively referred to as processors 412), as shown in FIG. 6. Data integrity device 400 may include memory 408 (e.g., RAM, DRAM, DDR DRAM, VRAM, RDRAM, etc.), non-volatile memory such as PROM (Programmable Read-Only Memory) 410, and processors 412. As FIG. 6 shows, data integrity device 400 may be coupled to interconnect 164.

The processors may be independently enabled and disabled in some embodiments. Depending on the level of data integrity desired, a user may select how many of the processors 412 should be enabled to perform the data integrity operation. If more than one processor is enabled, the enabled processors may each perform the same data integrity calculation on the same data. The processors may perform the identical data integrity operations in lockstep (i.e., by performing the same operations on the same data at the same time at an atomic level of CPU instruction). If so, each of processors 412 may be the same type of processor (e.g., the same make, model, speed, etc.) in order to achieve the synchronization needed for proper lockstep operation. Note that in another embodiment, data integrity device 400 may only include a single processor.

Enabling more than one processor to perform the data integrity operation provides extra error protection since errors in one of the processors may be detected if the processor's outputs are not the same. When two or more processors are selected to perform the data integrity operation, one processor (e.g., 412A) may be designated a "master" processor. The master processor may perform comparison operations on the processors' results. For example, if two processors 412A and 412B are enabled to perform the data integrity operation, one of the processors 412B may provide its result to the master processor 412A. Processor 412A may compare its result with that of the other processor 412B. If the two results are the same, it may be assumed that both processors are operating correctly. However, if the results are not the same, one of the processors may be malfunctioning. In response to detecting that the results are not equal, processor 412A may assert a signal indicating that there is an error in data integrity device 400. Additionally, processor 412A may disable data integrity device (or enable a different set of processors in the data integrity device) and/or initiate diagnostics on processors 412A and 412B in order to determine the source of the error. Note that in an alternative embodiment, a third processor (e.g., processor 412n) may perform the comparison operation instead of processor 412A. The third processor may not perform the data integrity operation.

In some embodiments, only certain processors (e.g., processor 412A) may be designated master processors. In other embodiments, any processor 412 may be selected as master processor.

When more than two processors are enabled, each of the other enabled processors (e.g., 412B-412n) may provide its results to the master processor 412A (e.g., by storing its result in a memory accessible by processor 412A) at the end of each data integrity operation. The master processor 412A may compare each of the results and "vote" to determine the majority result. If all of the results are equal, all of the currently enabled processors may be assumed to be operating correctly. If one or more the results differ from the each other, however, one or more of the processors may be malfunctioning and the master processor 412A may generate an error indication. Additionally, the master processor 412A may indicate which processor(s) are suspected of malfunctioning based on which processor(s)'s results disagreed with the majority's result. The master processor 412A may also disable the dissenting processor(s) and/or initiate a diagnostic procedure for the dissenting processor(s) in an attempt to locate and/or correct the error. In some embodiments, the entire data integrity device 400 may be disabled if malfunction is suspected in any of the processors 412.

After the dissenting processor(s) are disabled, the remaining processors may continue to perform data integrity operations. If only two processors remain in operation, their results may be compared (as opposed to voting). In some embodiments, the data integrity device 400 may include one or more redundant processors that are configured to be switched into operation if one of the primary processors fails.

FIG. 7 shows exemplary settings for one embodiment of data integrity device 400. These settings may be selected in software (e.g., by specifying different values of a variable for a device-specific control function) or in hardware (e.g., by selecting different DIP switch settings). If the data integrity device is not installed in the system, the settings have no effect and the storage array and host system provides a default level of error protection (this default level may vary between systems—some systems may provide a relatively high default level of error protection while other systems may provide no default error protection at all).

Generally, whenever the data integrity device is described as being disabled, it means that none of the data integrity device's processors are enabled to perform the data integrity operation. Setting 0 indicates that although the data integrity device is installed in the storage system, none of the data integrity device's processors should be enabled. This option may be selected if enabling the data integrity device would reduce performance of the storage system beneath an acceptable level and/or if heightened error protection is a lower priority than performance. When this setting is selected, the other components in the system provide a default level of error protection as described above.

In this example, setting 1 enables one processor on the data integrity device. When this setting is selected, one of the data integrity device's processors performs a data integrity operation. If this setting (or any other setting that enables one or more of the data integrity device's processors) is selected when transfers are already being performed between the storage system and the host system, the host system may flush the data stream that is currently being transferred and reinitiate this data transfer after the data integrity device is enabled.

Setting 2 enables two processors on the data integrity device. The two processors may perform the same data integrity operation on the same data. In one embodiment, the processors may be configured to perform the operation in lockstep. When two processors are enabled, one of the processors (or, alternatively, a third processor or dedicated comparison logic on the data integrity device) compares both processors' results after each data integrity operation. If the results are equal, the enabled processors are assumed to be operating correctly. If the results are not equal, at least one of the enabled processors may be malfunctioning and the data integrity device may indicate that it is malfunctioning, disable the enabled processors, and/or initiate diagnostics on the enabled processors. While this setting provides a higher level of error protection since it also checks for errors in the data integrity device, performing the comparison operation may also increase the amount of time required for the data integrity device to process the data.

Setting 3 enables three processors. All three processors may perform a data integrity operation on the same data. The results of each processor may be compared using a voting operation. The voting operation may be performed by one of the enabled processors, by another processor that does not perform the data integrity operation, or by dedicated voting logic. In the voting operation, if a majority of the enabled processors generate the same result, that result is used to determine whether a data error is detected. Additionally, if one of the enabled processors generates a different result than the majority, that minority processor may be malfunctioning. If a different result is detected, the minority processor may be disabled, an error indication may be generated, and/or diagnostics may be initiated on the minority processor. If all of the processors generate the same result, all of the enabled processors may be assumed to be functioning properly. Like performing a comparison operation, performing a voting operation may increase the amount of time for the data integrity device to process a certain amount of data.

Note that the above settings are merely exemplary. Other embodiments may have additional or fewer settings and may define each setting differently. For example, in another embodiment, a data integrity device may include more than three processors, and the settings for that data integrity device may enable different numbers of processors than those shown in FIG. 7. In such an embodiment, more than three processors may be enabled at a time and the results may be compared using a voting scheme similar to the one described above.

Figure 8:
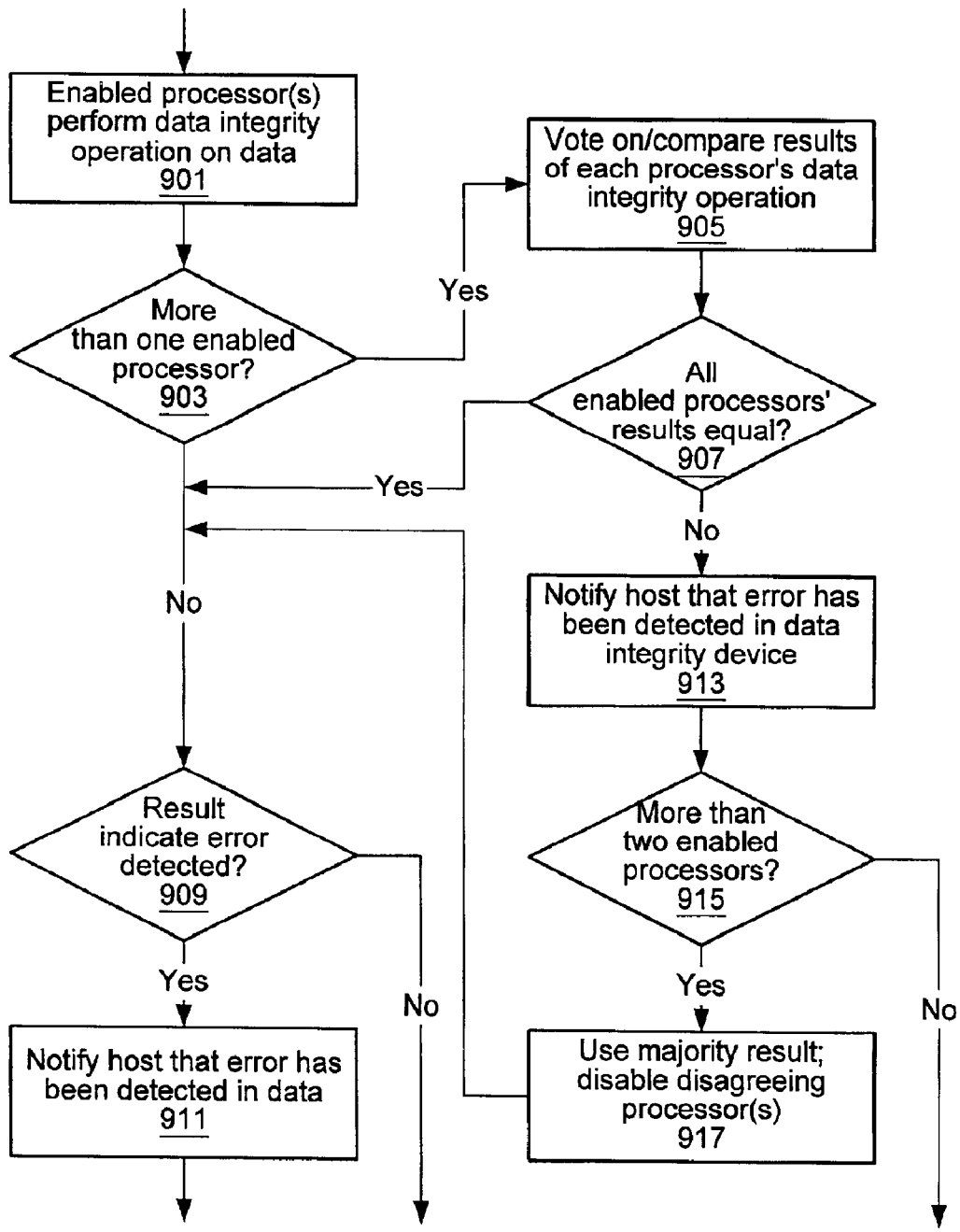
FIG. 8 is a flowchart illustrating another embodiment of a method of operating a data integrity device.

FIG. 8 shows one embodiment of a method of operating a data integrity device dependent on the number of processors currently enabled. At 901, the enabled data integrity processor(s) perform a data integrity operation on data. If only one processor is enabled, that processor's result indicates whether a data error is detected, as shown at 903 and 909. If that processor's result indicates that an error was detected in the data (e.g., that processor performed a data integrity operation, compared the result to a previously calculated result, and determined that the results were not equal), the data integrity device notifies the host or array controller of the error, as shown at 911.

If more than one data integrity device is enabled, the enabled processors' results may be compared or voted on, as indicated at 905. If only two processors are enabled, the results may be compared. If both results are equal and indicate that an error is detected, the data integrity device may notify the host or array controller that an error has been detected, as indicated at 907, 909, and 911. If the results are not equal, one or both of the processors may be malfunctioning and the data integrity device may notify the host or array controller that an error occurred in the data integrity device, as indicated at 907 and 913. The data integrity device may also disable the processors.

If more than two processors are enabled, a voting operation may be performed on their results. If any of the enabled processors' results are not equal, the data integrity device may indicate that an error is detected in the data integrity device, as indicated at 907 and 913. Additionally, the data integrity device may disable the disagreeing processor(s), as shown at 915 and 917. If the majority result indicates that a data error is detected, the data integrity device may notify the host that the data is erroneous, as indicated at 917, 909, and 911.

Returning to FIG. 6, data integrity device 400 may include a memory (e.g., random access memory 408 or read only memory 410) that stores instructions for the processor (s) 412 included in the data integrity device 400 to use when performing data integrity operations. The instructions may also include compare and/or voting instructions to be performed by a master processor. The instructions may also include kernel-type instructions for performing various setup and diagnostic procedures.

The instruction memory may be a non-volatile, non-rewritable memory (e.g., a ROM) in some embodiments. In other embodiments, the instructions may be stored in a memory device that can be updated by the host computer system so that the instructions to be performed by data integrity device 400 can be modified. For example, parity calculations performed by various components in a storage system may differ from each other. If data integrity device 400 is recalculating a particular checksum and comparing the recalculated checksum to a checksum calculated by another component in the storage system (e.g., a file system or array controller), data integrity device 400 must calculate the checksum in the same way as the component that calculated the original checksum. Thus, in some embodiments, the instructions stored in the data integrity device's memory may be updated to specify the checksum calculation the data integrity device's processor(s) should use when recalculating checksums. Additionally, some embodiments may allow parameters such as block size and the type of data integrity operation to be performed to be updated.

The memory used to store instructions may be a non-volatile memory (e.g., a PROM, EEPROM, etc.) in some embodiments. In other embodiments, volatile memory such as RAM may store the data integrity instructions. In these embodiments, the host computer system may be configured to provide a copy of the instructions to the data integrity device 400 each time the data integrity device is powered on. Such an embodiment may ensure that the data integrity device 400 has a valid copy of the instructions each time it is turned on.

The instructions may specify one of many methods available for performing a data integrity operation such as a checksum calculation. For example, a simple checksum algorithm may use the logical exclusive-OR (XOR) function to calculate checksums. Another technique may calculate the number of set bits in a particular unit of data to get a parity bit. If odd parity is used, the parity bit is 1 if the number of set bits in a unit of data is odd. Similarly, in even parity, the parity bit is set if the number of 1 bits in a unit of data is even. Other checksums such as ECC (Error Checking and Correcting or Error Checking Code), Reed-Solomon codes, and CRC (Cyclical Redundancy Checking) may be used in other embodiments. Generally, computing checksums for a given unit of data may involve many different methods of sequentially combining subunits of the data using some series of arithmetic or logical operations.

There are also several options available for storing checksums (e.g., in embodiments where data integrity device 400 generates both an original checksum and a recalculated checksum). In one embodiment, data integrity device 400 may append a checksum to the data that checksum verifies as the data is being written to the storage array. However, this embodiment may not adequately protect against silent errors since the checksum is stored in the same error-prone environment (e.g., a location that firmware subsequently erroneously modifies) or using the same error-prone operation (e.g., a write that fails due to a write cache error) as the data it is intended to protect. For example, if a disk drive fails to perform a write correctly, the checksum may also not be written, and thus the error may not be caught on any subsequent read. Other embodiments may provide better protection against silent errors by storing checksums in a location that is independent of the location(s) where the data verified by that checksum is stored. For example, in one embodiment, such an independent location may simply be an independent location on the same disk drive. In another embodiment, an independent location may be a location on a separate device within the storage array, such as a separate, non-volatile checksum memory. However, these embodiments storing checksums in independent locations also have drawbacks if each checksum access requires a separate operation to read or write the checksum.

To address this potential problem, data integrity device 400 may itself store the checksums (e.g., in memory 408) in some embodiments. Storing the checksums in an independent location (e.g., independent of the disk drive on which the data is stored) may improve both the protection against silent errors and the performance of the storage system. Since the checksums may be much smaller than their corresponding blocks, many or all of the checksums may be stored in a fast non-disk memory. However, if the checksum memory is volatile, a copy of the checksums may still be stored to a non-volatile memory (e.g., a disk drive) to prevent loss. In some embodiments, the data integrity device may store checksums to a particular disk (not the disk that the data is being stored to) in addition to or instead of storing the checksums within the data integrity device.

Figure 10:
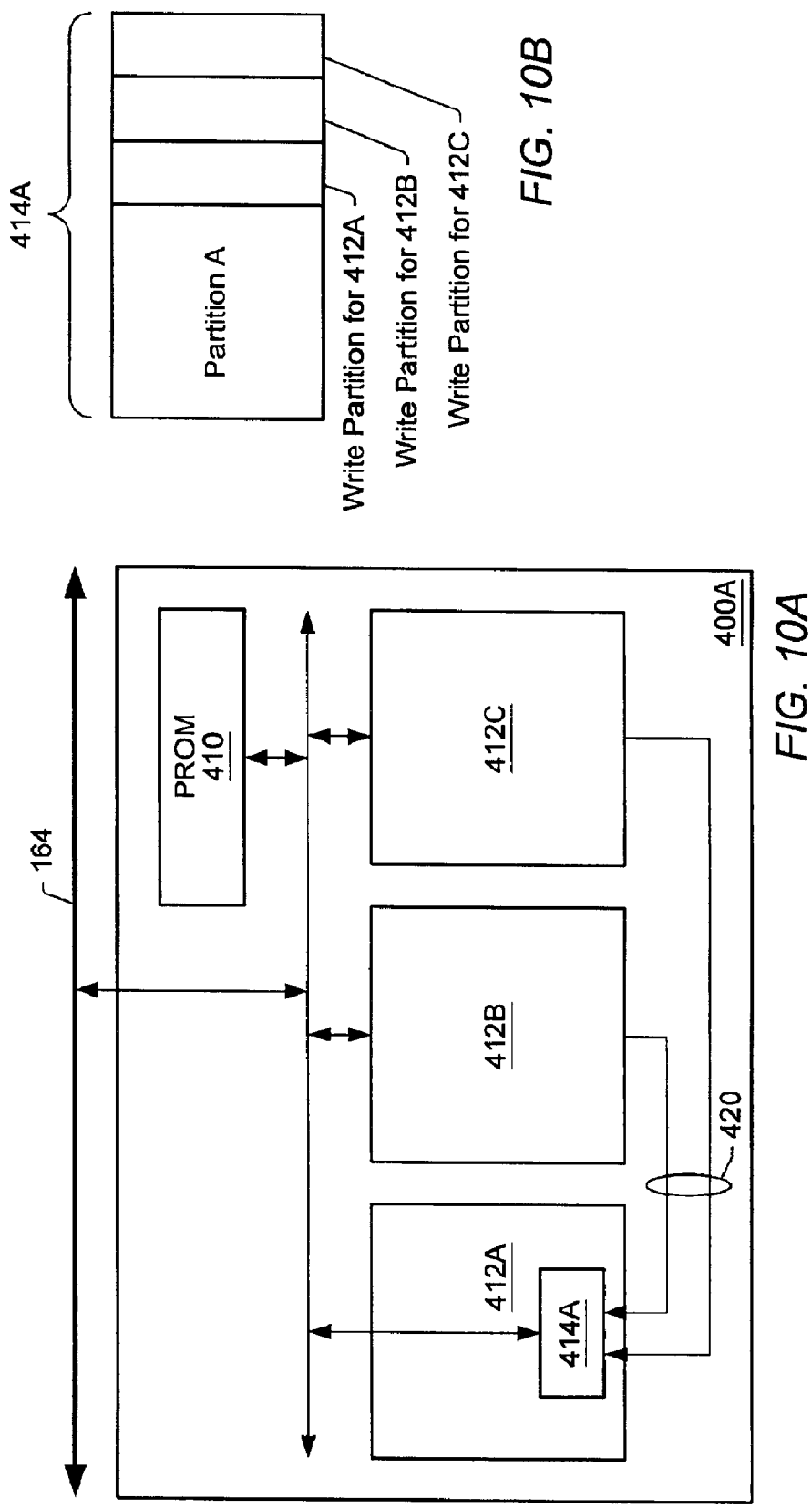
FIG. 10A is a functional block diagram one embodiment of a data integrity device that includes a processor with a shared cache.
FIG. 10B shows a functional block diagram of one embodiment of a shared cache.

In some embodiments, a data integrity processor's on-chip memory (e.g., an on-chip Level 1 (L1) cache) may be large enough to store units of data as they are transferred within the storage system. For example, blocks of data may be broken up into 512K packets for transfer. If a data integrity processor's on-chip memory is 8 Mb large, data integrity device 400 may be configured to provide one or more transferred data packets directly into that processor's on-chip memory (i.e., instead of first storing the data in an intervening memory). In such an embodiment, data integrity device 400 may not include a memory 408 that is external to the processors (e.g., as shown in FIG. 10A below). Alternatively, data integrity device 400 may include memory 408 for storing instructions but not for storing the data on which to perform the data integrity operation.

Thus, in some embodiments, data integrity device 400 may perform data integrity operations as data is transferred without buffering the data in memory 408. If the data integrity device indicates that a block or packet being transferred as part of a write operation failed a data integrity operation, the host system may flush the I/O (input/output) stream and redo the entire write.

In an alternative embodiment, data integrity device 400 may be configured to buffer all of the packets being transferred during a write into memory 408. This may free bus 164 for other operations that do not involve data integrity device 400 while data integrity device 400 performs the data integrity operation on each of the buffered packets in memory 408. Subsequent operations that involve data integrity device 400 may resume once data integrity device 400 has verified the buffered write data.

In another alternative embodiment, after sending each packet, the host system may be configured to wait until data integrity device 400 indicates that the data integrity operation was performed successfully before sending another packet. In such an embodiment, the host system may only resend an erroneous packet (as opposed to flushing the I/O stream and restarting an entire write) if data integrity device 400 indicates that a packet is erroneous.

In one embodiment, the host system may insert a packet identification value or time stamp value into each packet transferred during each write. If data integrity device detects 400 an error, data integrity device 400 may provide the host system with the packet identification or time stamp value of the erroneous packet. They may allow the host system to resend the erroneous packet without having to redo the entire block write.

In one embodiment, data integrity device 400 may have a unique device identification value. Data integrity device 400 may be configured to prepend each error message it generates with its device ID before providing the error message to the host system.

Data integrity device 400 may be configured to provide in-band (i.e., through the device driver) error indications in some embodiments. In one embodiment, the data integrity device may emulate error messages generated by another device (e.g., a drive controller or an array controller) in the storage system. In other embodiments, the data integrity device may include an interface (e.g., an Ethernet port) that allows the device to provide out-of-band error messages to the host system or array controller.

In response to an indication that an error is detected by data integrity device 400, the host system may be configured to perform one or more operations. If a storage device is detected, the host system may run diagnostic tests on and/or disable the storage device(s) on which the error is detected. The host system may correct the erroneous data (e.g., if, before the error occurred, the data was encoded using an error correcting code such as a Hamming code or redundant data such as a mirrored copy was created). If the error is an error detected in the data integrity device itself, the host system may disable the data integrity device (or the erroneous portions of the data integrity device). If the error is a transmission error, the host may resend the erroneous data.

Note that enabling one or more of processors 412 on data integrity device 400 may decrease storage system performance in some embodiments. If data integrity device 400 performs data integrity operations on units of data more slowly than the rate at which data units are normally transferred within the storage system, the host system may pad the data stream or otherwise reduce the data transfer rate when the data integrity device is enabled so that data integrity device 400 has time to perform the data integrity operation on the data stream. Thus, in some embodiments, whenever data integrity device 400 is enabled, the host system may reconfigure the rate at which it transfers data to the storage system. The amount by which the transfer rate is reduced may vary depending on the level of error protection currently enabled (e.g., the number of processors 412 selected to perform the data integrity operation) in data integrity device 400. For example, the transfer rate may be reduced more if three or more processors are enabled to perform the data integrity operation than if two processors are enabled. Additionally, the more quickly the processors are able to perform the data integrity operation relative to the rate of data transfer in the system, the less padding will be needed. Thus, in some embodiments, processor performance may be such that no reduction in the data transfer rate is needed.

Alternatively, instead of processing data at the same rate as it is transferred, data integrity device 400 may be configured to buffer the data in the I/O stream (e.g., in memory 408) as described above. If the buffer is in danger of overflowing, data integrity device 400 may assert a signal (e.g., an interrupt) to the host system indicating that the I/O stream should be stalled. For example, the data integrity device may be configured to generate an interrupt if the amount of data in memory 408 exceeds a threshold level.

In another embodiment, the transfer rate may be reduced if the host system is configured to wait until data integrity device 400 indicates that the data integrity operation was performed successfully on a transferred packet before transferring another packet. In yet other embodiments, data integrity device 400 may be configured to prevent an acknowledgement or ready signal corresponding to a data transfer from being asserted (e.g., by a disk drive in response to a write) to the host system until the data integrity device 400 has verified the data. By controlling the acknowledgement or ready signals, the data integrity device 400 may effectively slow data transfers to the rate at which the data integrity operation is being performed.

Figure 9:
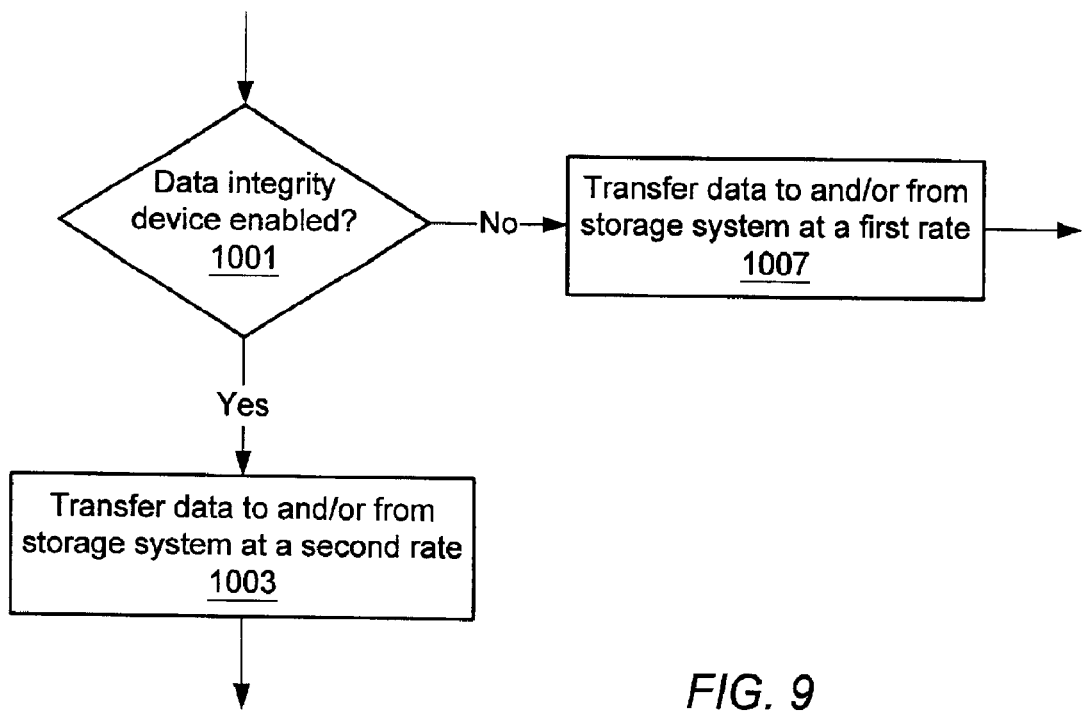
FIG. 9 is a flowchart of one embodiment of a method of operating a data processing system that includes a data integrity device.

FIG. 9 shows one embodiment of a method of transferring data to and from a storage system that includes a data integrity device. If the data integrity device is disabled, data transfer may be effected between a host system and the storage system at a first data rate, as shown at 1001 and 1005. Various components in the host system and the storage system may provide a default level of error protection for the data when the data integrity device is disabled. If the data integrity device is enabled, data transfer between the storage system and the host system may take place at a second data rate, as shown at 1001 and 1003. The second data rate may be the same as or less than the first data rate. The enabled data integrity device provides error protection in addition to the default level of error protection provided by the other components in the host and storage systems.

Data Integrity Device with Shared Cache

FIG. 10A shows another embodiment of a data integrity device 400A. In this embodiment, data integrity device 400A includes three processors 412A–412C (collectively referred to as processors 412). PROM 410 may store instructions that enable processors 412 to perform data integrity operations. PROM 410 may also include instructions enabling processors 412 to perform diagnostic operations if an error is detected in the data integrity device (e.g., if multiple processors perform the same data integrity operation on the same data and generate different results). As described above, data stored in PROM 410 may be updated by the host system in some embodiments.

At least one of the processors (here, 412A) may include an on-chip cache 414A that is integrated on the same semiconductor substrate as processor 412A. Each of the other processors 412B and 412C may be configured to directly access processor 412A's on-chip cache via a specialized bus or set of memory connections 420. In some embodiments, the shared cache 414A may be multi-ported in order to allow each processor 412 to simultaneously access data within shared cache 414A, and thus each processor may have a dedicated connection 420, as shown in FIG. 10A. In embodiments where the shared cache is not multi-ported, the processors may be configured to stagger their accesses to the shared cache. Accordingly, in some embodiments, the processors may not operate in lockstep.

Allowing processors to share access to an on-chip cache 414A may increase the speed at which the data integrity device 400A performs data integrity operations. For example, if the master processor 412A (i.e., the processor that performs comparison and voting operations) has an on-chip cache 414A that processors 412B and 412C can access, processors 412B and 412C can write their results directly into processor 412A's on-chip cache. This may allow processor 412A to perform comparison and/or voting operations on processors 412B and 412C's results (as well as processor 412A's result, if it is also generating a result), which are already stored in its on-chip cache 414A, without having to retrieve the other processors' results from an external memory location. This may significantly decrease the number of processor cycles used to perform voting and/or comparison operations in some embodiments.

In general, providing a shared cache may increase the speed at which comparison and voting operations are performed. A processor including an embodiment of a shared cache may be used in many contexts, including the storage system context described herein. In some embodiments, shared cache 414A may include what is typically referred to as an L1 (Level 1) cache and/or an L2 (Level 2) cache.

In some embodiments, processors' access to the shared cache may be conditioned on the mode in which the data integrity device is operating. For example, if the operating mode of the data integrity device is one in which only two of the processors are enabled to perform the data integrity operation, only those two processors may be enabled to access the shared cache. Additionally, a processor's access to the shared cache may be limited based on that processor's mode (e.g., what type of operations the processor is currently performing). Thus, in some embodiments, a processor may only have access to the shared cache if it is performing a data integrity operation or if it is storing the result of a data integrity operation. Accordingly, in those embodiments, processors performing operations such as verification or diagnostic operations on the data integrity device may not be able to access the shared cache. In some embodiments, the master processor or the processor that includes the shared cache may always have access to the shared cache, regardless of what mode that processor or the data integrity device is operating in. However, in other embodiments, even the master processor or the processor that includes the shared cache may not be able to access the shared cache in certain modes.

FIG. 10B shows one embodiment of a shared cache 414A. In this embodiment, memory 414A is partitioned between processors 412. The partitions may be set up so that each processor has a unique write partition that none of the other processors can write into. Allocating a unique write partition to each processor may minimize the possibility that one processor's error will affect another processor's result. In turn, this may increase the possibility of detecting which processor caused an error, since only that processor's result should be erroneous.

Another partition (labeled Partition A) may store the data on which the data integrity operation is to be performed (e.g., a packet transmitted on bus 164). This partition may also store instructions for performing the data integrity operation and/or the voting/comparison operations. In some embodiments, all of the processors may be able to read all of the partitions in memory 414A, and each processor may execute instructions and operate on data stored in Partition A of the shared cache. In another embodiment, only the processor containing the shared cache may access Partition A. The other processors may each have their own on-chip caches that store their copies of the instructions and data. Since this embodiment may provide additional encapsulation for each processor, it may allow a malfunctioning processor to be more easily identified. Also, in some embodiments, if each processor operates on data and instructions in its own on-chip cache, higher performance may be achieved.

Each partition may be set up as either a soft partition or a hard partition. The shared cache 414A may be soft-partitioned by providing each processor 412 with a unique set of write addresses corresponding to a unique write partition within the shared cache. If the shared cache 414A is hard partitioned, the shared cache may be physically divided between the processors 412.

In some embodiments, each of the processors 412 configured to access the shared cache 414A may be integrated into the same integrated circuit package (not shown). In this embodiment, the connections between each processor and the shared cache may be internal to the package. Such a multi-processor package may require more cooling than a typical single-processor package in order to avoid overheating. A multi-processor package may also have a different pin configuration than a typical single-processor package.

In some embodiments, each of the processors 412 may have a sharable cache like cache 414A. The processor currently configured as the master processor may be the processor whose cache is currently being shared. If the current master processor is disabled (e.g., because an error was detected in that processor), a new master processor may be selected and its sharable cache may then be shared between any other enabled processors. Note that in other embodiments, however, only one processor may be configured with a sharable cache.

Figure 11:
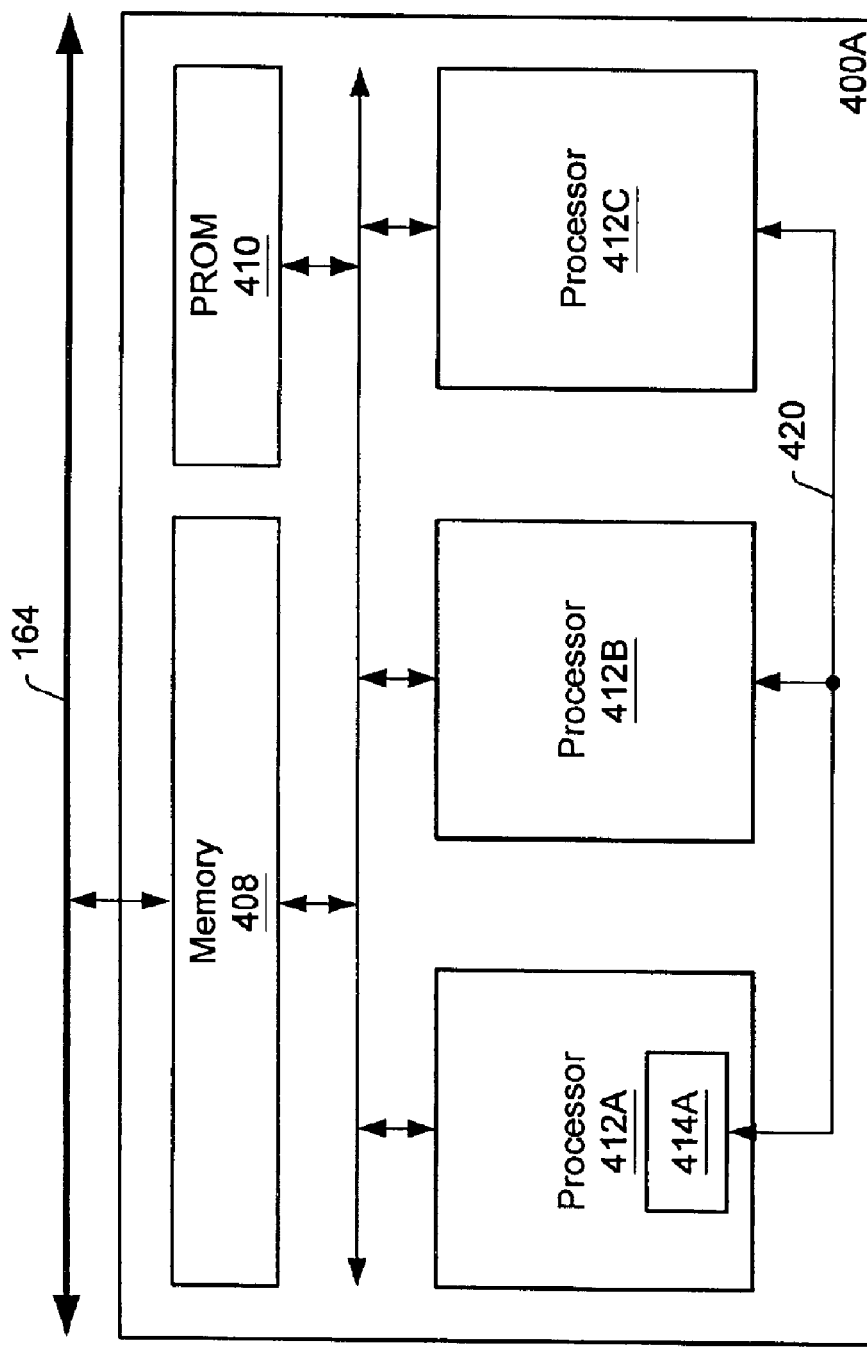
FIG. 11 shows a functional block diagram of another embodiment of a data integrity device that includes a processor with a shared cache.

FIG. 11 shows another embodiment of a data integrity device 400A that includes at least one processor 412A with a shared cache 414A. In this embodiment, the data integrity device 400A includes a RAM 408. Thus, data and/or instructions may be stored in RAM 408 and copied into shared cache 414A as needed.

In one embodiment, each processor may include its own cache to store data and instructions. Processors 412B and 412C may only access shared cache 414A when writing their results. If processors 412 are operating in lockstep (e.g., performing the same operations on the same data at the same time), one processor (e.g., the master processor) may be configured to initiate cache fill requests to RAM 408. When data or instructions are provided from RAM 408 in response to that processor's cache fill request, all of the currently enabled processors may load that data into their caches.

In another embodiment, the processors may perform the same operation on the same data without operating in lockstep. In those embodiments, the processors may be configured so that each processor's cache fill requests occur at a different time (e.g., so that the cache fill requests are staggered).

Figure 12:
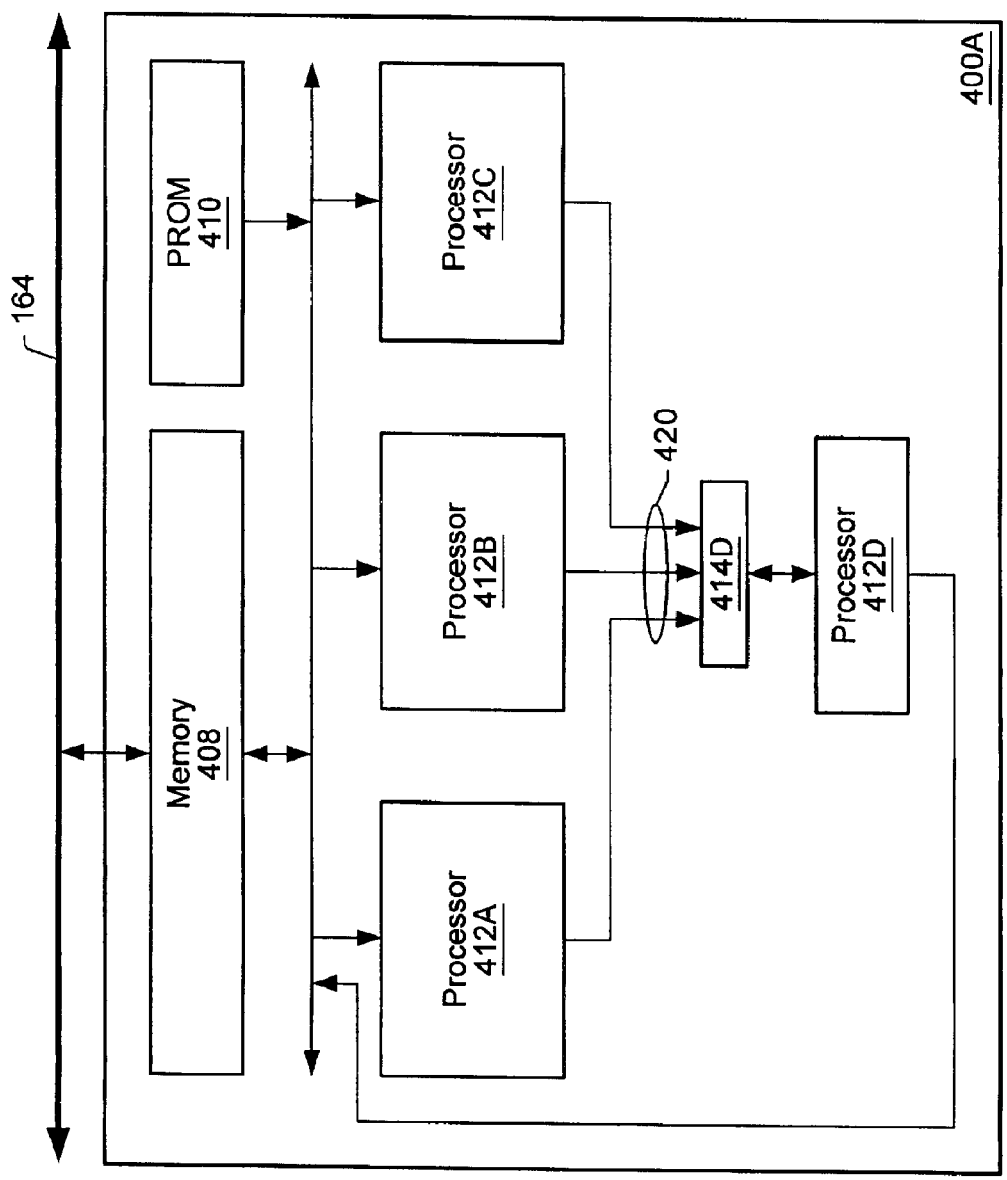
FIG. 12 is a functional block diagram of yet another embodiment of a data integrity device that includes a processor with a shared cache.

FIG. 12 shows another embodiment of a data integrity device 400A. In this embodiment, the data integrity device includes four processors 412A–412D (collectively referred to as processors 412). In this embodiment, processors 412A–412C may be enabled to perform a data integrity operation. As each processor 412A–412C generates a result, it may store the result in shared cache 414D. Unlike the embodiments shown in FIGS. 10–11, the shared cache 414D shown in FIG. 12 is not integrated with any of the processors 412. When each processor 412A–412C's result has been stored in shared cache 414D, processor 414D may access the shared cache 414D to perform a comparison and/or voting operation.

In some embodiments, processor 412D may only perform comparison and voting operations instead of also performing the data integrity operation. In some embodiments, shared cache 414D may be multi-ported, allowing processors 412A–412C to write their results to shared cache 414D at the same time and/or allowing processor 412D to access results stored in the shared cache at the same time as processors 412A–412C are writing to the shared cache. Like the shared cache 414A shown in FIG. 10B, cache 414D may be partitioned between the processors. For example, each of processors 412A–412C may be configured to write results in a unique write partition within cache 414D. Processor 412D may be configured to read any of the partitions within cache 414D, allowing it to access each of the other processors' results in order to perform a comparison/voting operation without accessing a slower memory. Note that in some embodiments, shared cache 414D may be integrated with processor 412D.

Figure 13:
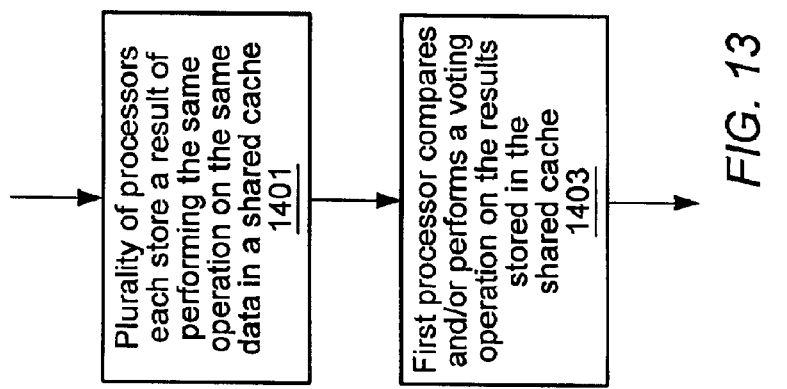
FIG. 13 is a flowchart of one embodiment of a method of using a shared cache.

FIG. 13 shows one embodiment of a method of sharing a cache between several processors. At 1401, a plurality of processors each store a result in a shared cache. Each of the processors may generate its result by performing the same data integrity operation on the same data as each of the other processors. The first processor performs a comparison and/or voting operation on each of the results stored in the shared cache, as indicated at 1403. The first processor may not be included in the plurality of processors in some embodiments. Since the results are stored in the first processor's cache, the first processor may perform the voting and/or comparison operation without having to access a slower memory to retrieve the results.

The term "disk drive" may be used to refer to any semi-permanent or permanent storage place for digital data, as opposed to a temporary workspace for executing instructions and processing data (e.g. a random access memory (RAM)). A disk drive may be any peripheral storage device that holds, spins, reads and writes magnetic or optical disks or any other suitable mass storage media, including solid-state media and magnetic tape media. A disk drive may be a receptacle for disk or tape cartridges, tape reels, disk packs or floppy disks, or it may contain non-removable disk platters like most personal computer hard disks. In some embodiments, disk drives may be limited to disk-type storage media.

Furthermore, it is noted that the term "storage array" may be used to refer to many different storage systems. For example, in some embodiments, a storage array may simply refer to a JBOD (Just a Bunch of Disks) array, whereas in another embodiment, the same description may refer to a RAID array.

Numerous variations and modifications will become apparent to those skilled in the art once the above disclosure is fully appreciated. It is intended that the following claims be interpreted to embrace all such variations and modifications.

What is claimed is:

1. A data processing system comprising:
a host computer system;
an interconnect coupled to the host computer system;
a storage array coupled to the interconnect and configured to store data received from the host computer system over the interconnect; and
a data integrity device coupled to the interconnect and comprising at least one processor, wherein the data integrity device is configured to be enabled and disabled;
wherein if the data integrity device is disabled, the host computer system and the storage array provide a first level of error protection for the data;
wherein if the data integrity device is enabled, the at least one processor is configured to perform a first data integrity operation on the data in order to provide a second level of error protection for the data in addition to the first level of error protection provided by the host computer system and the storage array.

2. The data processing system of claim 1, wherein the first data integrity operation comprises a checksum calculation.

3. The data processing system of claim 1, wherein the at least one processor is configured to perform the first data integrity operation by comparing a first checksum corresponding to the data to a second checksum calculated from the data by the at least one processor.

4. The data processing system of claim 3, wherein the first checksum is transferred with the data.

5. The data processing system of claim 3, wherein the data integrity device is configured to provide an error indication if the first checksum does not equal the second checksum.

6. The data processing system of claim 1, wherein the data is encoded with an error correcting code, wherein as part of the first data integrity operation the data integrity device is configured to verify and correct the data using the error correcting code.

7. The data processing system of claim 1, wherein the data integrity device is configured to perform the first data integrity operation on the data as the data is written to the storage array.

8. The data processing system of claim 7, wherein in response to an indication that the data has been written to the storage array, the data integrity device is configured to perform a second data integrity operation on the data.

9. The data processing system of claim 7, wherein the data integrity device is configured to perform a second data integrity operation on the data as the data is read from the storage array.

10. The data processing system of claim 1, wherein the data integrity device comprises a plurality of processors, wherein the plurality of processors are each configured to perform the first data integrity operation on the data at a same time.

11. The data processing system of claim 1, wherein the data integrity device comprises a plurality of processors, wherein each of the plurality of processors is configured to be enabled independently of each of other processor in the plurality of processors.

12. The data processing system of claim 11, wherein a control function running on the host system is configured to allow a user to select how many of the plurality of processors are enabled.

13. The data processing system of claim 11, wherein if more than two of the plurality of processors are enabled, the data integrity device is configured to perform a voting operation on each of the enabled processors' results.

14. The data processing system of claim 13, wherein if a majority of the enabled processors generates a same result and a minority of the enabled processors generates a different result, the data integrity device is configured to provide an error indication indicating that an error occurred in the data integrity device.

15. The data processing system of claim 14, wherein the data integrity device is configured to disable the minority of the enabled processors that generate the different result.

16. The data processing system of claim 15, wherein the data integrity device comprises one or more redundant processors, wherein the data integrity device is configured to enable one of the redundant processors in response to disabling one of the minority of the enabled processors.

17. The data processing system of claim 14, wherein the data integrity device is configured to initiate diagnostic tests on the minority of the enabled processors that generate the different result.

18. The data processing system of claim 11, wherein if two of the plurality of processors are enabled, the data integrity device is configured to compare the enabled processors' results.

19. The data processing system of claim 1, wherein the storage array comprises a RAID (Redundant Array of Inexpensive Disks) array.

20. The data processing system of claim 17, wherein the storage array comprises an array controller configured to manage the RAID array, wherein the array controller is configured to perform a second data integrity operation on the data.

21. The data processing system of claim 1, wherein the storage array comprises a plurality of disk drives, wherein each disk drive comprises a controller, wherein each disk drive's controller is configured to perform a second data integrity operation on the data.

22. The data processing system of claim 1, wherein a file system running on the host system is configured to perform a second data integrity operation on the data.

23. The data processing system of claim 1, wherein the data integrity device comprises a memory configured to store instructions for performing the data integrity operation.

24. The data processing system of claim 23, wherein the host system is configured to update the instructions for performing the data integrity operation that are stored in the memory.

25. The data processing system of claim 1, wherein the data integrity device comprises a memory configured to store instructions for performing diagnostic tests on the at least one processor comprised in the data integrity device.

26. The data processing system of claim 1, wherein the data integrity device comprises a memory configured to buffer the data.

27. The data processing system of claim 26, wherein a write from the host system to the storage array comprises a plurality of data packets, wherein the data is a first data packet.

28. The data processing system of claim 27, wherein after initiating a transfer of the first packet to the storage array, the host system is configured to wait until the data integrity device has performed the data integrity operation on the first data packet before initiating a transfer of a second data packet.

29. The data processing system of claim 26, wherein a write from the host system to the storage array comprises a plurality of data packets, wherein the data comprises the plurality of data packets in the write.

30. The data processing system of claim 1, wherein the data integrity device comprises a memory and wherein the data integrity device is configured to store a result of the data integrity operation in the memory.

31. The data processing system of claim 1, wherein the data comprises a packet, wherein the host system is configured to insert one of a packet identification and a time stamp into the packet, wherein if the data integrity device detects an error in the packet, the data integrity device is configured to provide the one of the packet identification and the time stamp to the host system.

32. The data processing system of claim 1, wherein the data integrity device has an associated device identification, wherein the data integrity device is configured to provide its associated device identification if the data integrity device provides an error indication.

33. The data processing system of claim 1, wherein the data integrity device is configured to provide in-band error indications.

34. The data processing system of claim 1, wherein the data integrity device is configured to provide out-of-band error indications.

35. The data processing system of claim 1, wherein the data integrity device is implemented as a modular device that is configured to be inserted into the storage array.

36. The data processing system of claim 1, wherein the data integrity device is configured to be removable from the data processing system.

37. The data processing system of claim 1, wherein in response to the data integrity device being enabled, the host system is configured to reduce a rate at which the data is transferred on the interconnect.

38. The data processing system of claim 37, wherein the data integrity device comprises a plurality of processors, wherein an amount by which the rate is reduced depends on a number of the plurality of processors that are currently enabled in the data integrity device.

39. A data processing system comprising:
a host computer system;
a storage array;
an interconnect coupled to the host computer system and the storage array and configured to transfer data between the host computer system and the storage array; and
a data integrity device coupled to the interconnect and comprising a plurality of processors configured to be individually enabled or disabled by the host computer system, wherein each processor is configured to perform a data integrity operation on the data being transferred over the interconnect when that processor is enabled;

wherein a number of the processors enabled by the host computer system corresponds to a user-selected level of error protection.

40. A method of performing a data integrity operation comprising:

initiating a data transfer between a host computer system and a storage array;

a plurality of processors in a data integrity device each performing a data integrity operation on the data to generate a result in response to said initiating if the data integrity device is enabled; and if a comparison of the results from each of the plurality of processors indicates that the data is erroneous, providing an indication that the data is erroneous to the host computer system.

41. The method of claim 40, wherein said performing comprises performing a checksum calculation on the data.

42. The method of claim 40, wherein said performing comprises capturing a first checksum transferred with the data and comparing the first checksum to a second checksum calculated from the data.

43. The method of claim 42, further comprising providing an error indication if the first checksum does not equal the second checksum.

44. The method of claim 40, wherein the data is encoded with an error correcting code, wherein said performing comprises verifying and correcting the data using the error correcting code.

45. The method of claim 40, said performing comprises performing the data integrity operation on the data as the data is written to the storage array.

46. The method of claim 40, wherein the data integrity device is configured to perform the data integrity operation on the data as the data is read from the storage array.

47. The method of claim 40, wherein said performing comprises the plurality of processors performing the data integrity operation on the data in lockstep.

48. The method of claim 40, further comprising performing a voting operation on the processors' results.

49. The method of claim 48, further comprising providing an error indication indicating that an error occurred in the data integrity device if a majority of the processors generates a same result and a minority of the processors generates a different result.

50. The method of claim 48, further comprising disabling the minority of the processors that generate the different result.

51. The method of claim 50, further comprising enabling one or more redundant processors in response to disabling one or more of the minority of the processors.

52. The method of claim 48, further comprising initiating diagnostic tests on the minority of the processors that generate the different result.

53. The method of claim 40, further comprising comparing the processors' results.

54. The method of claim 40, further comprising buffering the data in a memory comprised in the data integrity device.

55. The method of claim 54, wherein a write from the host computer system to the storage array comprises a plurality of data packets, wherein the data is a first data packet.

56. The method of claim 55, further comprising the host computer system waiting until said performing has had time to complete before initiating a transfer of a second data packet.

57. The method of claim 54, wherein a write from the host computer system to the storage array comprises a plurality of data packets, wherein the data comprises the plurality of data packets in the write.

58. The method of claim 40, wherein the data comprises a packet, wherein the method further comprises:

the host computer system inserting one of a packet identification and a time stamp into the packet; and the data integrity device providing the one of the packet identification and the time stamp to the host system if the processors' results are equal and indicate that the packet is erroneous.

59. The method of claim 40, further comprising enabling the data integrity device and the host computer system reducing a rate at which the data is transferred on the interconnect in response to the data integrity device being enabled.

60. The method of claim 40, further comprising the host computer system disabling one or more of the processors.

61. The method of claim 40, further comprising the host computer system enabling the processors.

62. A method comprising:

performing a first data transfer between a host computer system and a storage array, wherein a data integrity device is disabled during said performing;

subsequent to said performing, enabling the data integrity device;

initiating a second data transfer between a host computer system and a storage array;

in response to said enabling and said initiating, one or more processors comprised in the data integrity device performing a data integrity operation on data transferred in the second data transfer.

63. The method of claim 62, wherein said enabling comprises the host computer system enabling a number of processors comprised in the data integrity device, wherein the number of processors corresponds to a user-selected level of error protection.

64. The method of claim 63, wherein if the number of processors is two, said performing a data integrity operation comprises:

two processors comprised in the data integrity device each performing the data integrity operation on the data transferred in the second data transfer to generate a result; and a first processor comparing the two processors' results and generating an error indication if the two processors' results are not equal.

65. The method of claim 63, wherein if the number of processors is greater than two, said performing a data integrity operation comprises:

three or more processors comprised in the data integrity device each performing the data integrity operation on the data transferred in the second data transfer to generate a result;

a first processor performing a voting operation on the three or more processors' results and generating an error indication if the three or more processors' results are not equal.

66. A data integrity device comprising:

an interface configured to receive data being transferred in a storage 'system; and one or more processors coupled to receive the data from the interface and configured to perform a data integrity operation on the data;

wherein at least one of the one or more processors is configured to provide an indication if an error is detected in the data; and wherein the one or more processors are configured to be enabled and disabled.

67. A data processing system comprising:

host computing means for processing data;

storage means for storing the data;

communication means for communicating the data from the host computing means to the storage means, wherein the communication means are coupled to the host computing means and the storage means;

means for performing a data integrity operation on the data communicated on the communication means and responsive to various settings, wherein one of the settings disables the means for performing the data integrity operation;

wherein if the means for performing the data integrity operation are disabled, the host computing means and the storage means provide a first level of error protection for the data;

wherein if the means for performing the data integrity operation are enabled, the means perform the data integrity operation on the data in order to provide a second level of error protection for the data in addition to the first level of error protection provided by the host computing means and the storage means.

* * * * *